United States Patent
Rho

(10) Patent No.: US 9,469,054 B2
(45) Date of Patent: Oct. 18, 2016

(54) IN-MOLD TRANSFER FILM HAVING AN ELASTIC TEXTURE

(71) Applicant: LG Hausys, Ltd., Seoul (KR)

(72) Inventor: Byung-Hyun Rho, Ulsan (KR)

(73) Assignee: LG Hausys, Ltd., Seoul (KR)

( * ) Notice: Subject to any disclaimer, the term of this patent is extended or adjusted under 35 U.S.C. 154(b) by 123 days.

(21) Appl. No.: 14/371,921

(22) PCT Filed: Dec. 3, 2012

(86) PCT No.: PCT/KR2012/010391
§ 371 (c)(1),
(2) Date: Jul. 11, 2014

(87) PCT Pub. No.: WO2013/118964
PCT Pub. Date: Aug. 15, 2013

(65) Prior Publication Data
US 2015/0017371 A1    Jan. 15, 2015

(30) Foreign Application Priority Data

Feb. 8, 2012    (KR) .................. 10-2012-0012800

(51) Int. Cl.
*B29C 33/68*    (2006.01)
*B29C 35/08*    (2006.01)
(Continued)

(52) U.S. Cl.
CPC ............... *B29C 33/68* (2013.01); *B29C 33/38* (2013.01); *B29C 35/02* (2013.01);
(Continued)

(58) Field of Classification Search
CPC ........... B32B 7/12; B32B 7/06; B32B 27/08; B32B 27/20; B32B 27/36; B32B 2307/75; B32B 2250/24; B32B 2255/10; B32B 2255/26; B32B 2264/102; B32B 2307/51; B32B 2307/748; B44C 1/172; B29C 33/38; B29C 33/68; B29C 35/02; B29C 35/0805; B29C 45/14827; B29C 2035/0827; B41M 7/0027; B41M 2205/10; Y10T 428/14; Y10T 428/1476

See application file for complete search history.

(56) References Cited

U.S. PATENT DOCUMENTS 3,533,822 A * 10/1970 Bailey ................. B44C 1/172
                                                              428/202
4,303,717 A * 12/1981 Andrews ............. B44C 1/172
                                                              427/407.1

(Continued)

FOREIGN PATENT DOCUMENTS

CN    101479095 A    7/2009
JP         79483 A    1/1995

(Continued)

OTHER PUBLICATIONS

International Search Report for PCT/KR2012/010391, mailed on Feb. 21, 2013.

(Continued)

*Primary Examiner* — Patricia L Nordmeyer
(74) *Attorney, Agent, or Firm* — Hauptman Ham, LLP

(57) ABSTRACT

Disclosed herein is an in-mold transfer film including a base film, a release film, a printed layer, and an adhesive layer which are stacked in series from bottom, wherein the release layer comprises a matte surface layer. Also disclosed herein is a method for manufacturing an in-mold transfer film including forming a release layer on the upper surface of a substrate layer; forming a printed layer on the upper surface of the release layer; and forming an adhesive layer on the upper surface of the printed layer, wherein the release layer comprises a matte surface layer.

15 Claims, 2 Drawing Sheets

(51) Int. Cl.
| | |
|---|---|
| B29C 35/02 | (2006.01) |
| B29C 33/38 | (2006.01) |
| B32B 7/12 | (2006.01) |
| B32B 27/08 | (2006.01) |
| B41M 7/00 | (2006.01) |
| B32B 7/06 | (2006.01) |
| B32B 27/20 | (2006.01) |
| B32B 27/36 | (2006.01) |
| B29C 45/14 | (2006.01) |
| B44C 1/17 | (2006.01) |

(52) U.S. Cl.
CPC .... *B29C 35/0805* (2013.01); *B29C 45/14827* (2013.01); *B32B 7/06* (2013.01); *B32B 7/12* (2013.01); *B32B 27/08* (2013.01); *B32B 27/20* (2013.01); *B32B 27/36* (2013.01); *B41M 7/0027* (2013.01); *B44C 1/172* (2013.01); *B29C 2035/0827* (2013.01); *B32B 2250/24* (2013.01); *B32B 2255/10* (2013.01); *B32B 2255/26* (2013.01); *B32B 2264/102* (2013.01); *B32B 2307/51* (2013.01); *B32B 2307/748* (2013.01); *B32B 2307/75* (2013.01); *B41M 2205/10* (2013.01); *Y10T 428/14* (2015.01); *Y10T 428/1476* (2015.01)

(56) References Cited

U.S. PATENT DOCUMENTS

| | | |
|---|---|---|
| 4,536,434 A | 8/1985 | Magnotta |
| 5,318,739 A | 6/1994 | Katagiri et al. |
| 2003/0211334 A1 | 11/2003 | Jones |
| 2010/0062218 A1* | 3/2010 | Atake ............... B29C 45/14827 428/141 |

FOREIGN PATENT DOCUMENTS

| | | | |
|---|---|---|---|
| JP | 11123897 A | 5/1999 | |
| JP | 2008518804 A | 6/2008 | |
| JP | 2009137219 A | 6/2009 | |
| JP | 2010234610 A | 10/2010 | |
| JP | 2011206952 A | 10/2011 | |
| JP | 201391255 A | 5/2013 | |
| JP | WO 2014203507 A1 * | 12/2014 | ............ B32B 27/30 |
| KR | 200230932 Y1 | 7/2001 | |
| KR | 1020020066647 A | 8/2002 | |
| KR | 100486658 B1 | 5/2005 | |
| KR | 20100048181 A | 5/2010 | |
| KR | 20110069462 A | 6/2011 | |

OTHER PUBLICATIONS

The extended European Search Report dated Sep. 9, 2015 in connection with the counterpart European Patent Application No. 12868277.0.
Chinese Office Action mailed on Apr. 7, 2015.
Japanese Office Action for Japanese Application No. 2014-553242 mailed on Apr. 21, 2015.

* cited by examiner ated upon in advance, and the examples of the representative, it was only dependent on light resistance.

IN-MOLD TRANSFER FILM HAVING AN ELASTIC TEXTURE

TECHNICAL FIELD

The present invention relates to an in-mold transfer film having an elastic texture and a method for manufacturing the same.

BACKGROUND ART

Prior normal transfer films have disadvantages of not only printed patterns are easily erasable, but also are easily scratched even with a small scratch since the transferred surface is not strong. Also, textures were only realizable by applying a coating solution, etc. directly on an injection molding product by a spray method and drying for a long period of time, and there have been no products released in a form of a film for realizing textures.

Also, in Korea laid-open publication No. 10-2011-0069462, a 3 dimensional pattern layer using a transparent ink is comprised on an upper surface of a printed layer, but this is to express hairline patterns and 3 dimensional metallic textures, and for creating various textures is not disclosed.

Therefore, the need for a transfer film realizing elastic textures able to be applied by an in-mold method not a spray method has come to the fore.

DISCLOSURE

Technical Problem

An objective of the present invention is to provide a method for manufacturing an in-mold transfer film, in which various texture effects of rubber textures, skin textures, silk textures, etc. are possible and applying an in-mold method, not a spray method, is possible.

Another objective of the present invention is to provide an in-mold transfer sheet able to be mass produced through the manufacturing method.

Technical Solution

To achieve the objective described above, an in-mold transfer film of the present invention comprises, a base film, a release film, a printed layer, and an adhesive layer which are stacked in series from bottom, wherein the release layer comprises a matte surface layer.

To achieve another objective described above, a method for manufacturing an in-mold transfer film in accordance with the present invention comprises forming a release layer on the upper surface of a substrate layer; forming a printed layer on the upper surface of the release layer; and forming an adhesive layer on the upper surface of the printed layer, wherein the release layer comprises a matte surface layer.

Advantageous Effects

An in-mold transfer film provided by the present invention, by comprising a matte surface layer, has superior excellence in abrasion resistance, chemical resistance, solvent resistance, light resistance, and scratch resistance.

Also, by comprising an additional coating layer on top of a release layer, various feel of skin textures, rubber textures, silk textures, etc. may be realized by overcoming plain surfaces and having smooth characteristics.

BEST MODE

Figure 1:
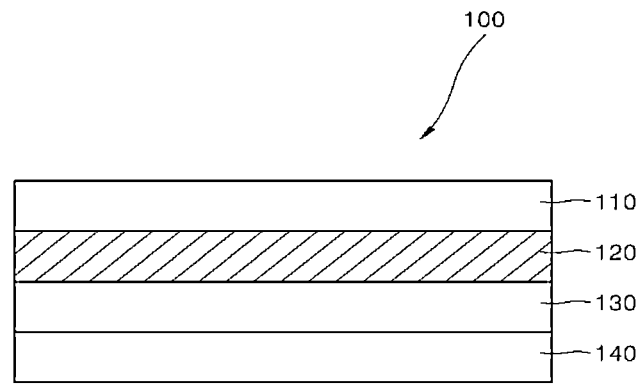
FIG. 1 is a cross sectional diagram showing an in-mold transfer film in accordance with an embodiment of the present invention.
Figure 2:
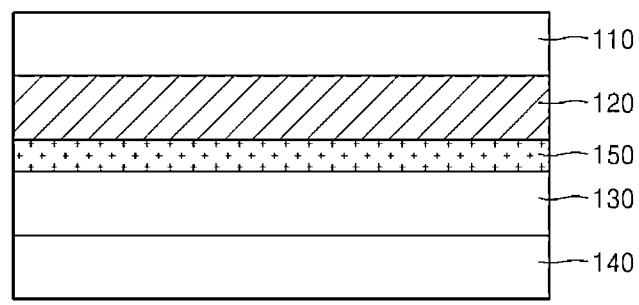
FIG. 2 is a cross sectional diagram showing an in-mold transfer film comprising a coating layer formed with an elastic texture coating solution in accordance with another embodiment of the present invention.

Advantages and features of the present invention, and method for achieving thereof will be apparent with reference to the following examples. But, it should be understood that the present invention is not limited to the following examples and may be embodied in different ways, and that the examples are given to provide complete disclosure of the invention and to provide thorough understanding of the invention to those skilled in the art, and the scope of the invention is limited only by the accompanying claims and equivalents thereof. Like components will be denoted by like reference numerals throughout the specification.

Hereinafter, an in-mold transfer film having an elastic texture and a method for manufacturing the same is described in reference to the accompanying drawings.

In-Mold Transfer Film

FIG. 1 is a cross sectional diagram showing an in-mold transfer film in accordance with an embodiment of the present invention.

Referring to FIG. 1, the in-mold transfer film of the present invention comprises, a base film (110), a release layer (120), a printed layer (130), and an adhesive layer (140) which are stacked in series from bottom. Here, the release layer comprises a matte surface layer.

The base film (110) may be formed with at least one material selected from PET (polyethyleneterephthalate), PC (polycarbonate), PP (polypropylene) and acrylic. Also in the present invention, the thickness of the base film (110) is not specifically limited, and may be controlled according to desired effects.

The release layer (120) is formed on the upper surface of the base film (110), and it is for, after an injection molding product, which is manufactured by injection molding a melted resin with an in-mold transfer film (100) inserted in the injection mold, is manufactured, containing the base film (110) from the injection molding product.

The component forming the release layer (120) may be at least one material selected from an unsaturated ester based, an epoxy based, an epoxy-melamine based, an aminoalkyd based, an acrylic based, a melamine based, a fluorine based, a cellulose based, a urea resin based, a polyolefine based, and a paraffin based, but is not limited to these. The thickness of the release layer described above is not specifically limited in the present invention, and may be adequately controlled taking the objective of the present invention into consideration.

The release layer (120) of the present invention comprises a matte surface layer. When applied to the transfer film in the present invention, it shows matte effects, improves durability, and takes the role of securing scratch resistance, etc. The material composing the matte surface layer is not specifically limited if it has resistance with respect to heat or pressure, does not disappear during manufacturing or usage, and has adequate hardness thus having excellent durability, abrasion resistance, and scratch resistance.

The matte surface layer in the present invention may comprise a matte additive and silica particles. The matte additive may comprise $SiO_2$, $Al_2O_3$, $TiO_2$, $Na_2O$, other additives, etc., but is not limited to these, and is not specifically limited if it is an additive able to control gloss.

The mean diameter of the silica particle is 1 to 8 μm. When the mean diameter of the silica particle is less than 1 μm, release performance may drop due to excessive addition, and there are possibilities of dispersion not being smooth, and when the mean diameter of the silica particle exceeds 8 μm, concerns of poor coating is high. More specifically, when the mean diameter of the silica particle is 1 to 2 μm, a smooth feeling matte effect is given, and a matte effect of a slightly rough feeling when 3 to 5 μm and a more rough feeling when 5 to 8 μm may be realized.

Therefore, it may be adequately controlled taking the objective of the present invention into consideration within the range of the mean diameter of the silica particle.

Also, in the case of the amount of silica particles, 5 to 10 parts by weight may be comprised based on 100 parts by weight of the total composition of the matte surface layer. Especially, It is preferable to comprise 6 to 8 parts by weight in that it may make the matte effect on the release surface excellent. When the silica particle is comprised less than 5 parts by weight, tackiness occurs on the matte surface layer, that is, the release layer surface and a slight stickiness may occur, and when the silica particle is comprised exceeding 10 parts by weight, gloss does not go any lower and increase in the matte effect may not appear.

The upper surface of the release layer (120) of the present invention may comprise a coating layer (150) formed from an elastic texture coating solution. The elastic texture coating solution may comprise any one among a urethane acrylate resin or a polyester resin. Here, the polyester resin comprises a soft polyester resin and a hard polyester resin. More specifically, it is preferable to comprise a urethane acrylate resin in the case of UV curing the coating solution, and a soft polyester resin and hard polyester resin in the case of thermal curing.

The urethane acrylate resin is a compound, which is a urethane resin made into a UV curable type, and is a generic term of compounds having a urethane bond and an acrylate group together. It is designed corresponding to uses from the component type and mixing ratio, and is used in many areas as a component of the UV curable resin composition.

Also, the soft polyester resin and the hard polyester resin are comprised at a ratio of 4:6 to 6:4. Especially, comprising the soft polyester resin and the hard polyester resin at a ratio of 5:5 is preferable in that abrasion resistance may be secured.

When the resin deviates from the range, the abrasion resistance is excellent but elasticity may drop when the amount of the hard polyester resin is much more, and there are concerns of the abrasion resistance weakening when the amount of the soft polyester resin is much more.

The 'hard' describes a polymer having less than about 150%, preferably less than about 100% of an elongation percentage according to ASTM D-412. The 'soft' describes a polymer having over about 200%, preferably over about 300% of an elongation percentage according to ASTM D-412. Also, the elongation percentage of the 'soft' is typically less than about 800%. In the case of reactive compositions, the 'soft' is a non-film forming solution and thus shows the target elongation percentage after cross-linking. In this case, the elongation percentage of the 'soft' may be decided by adding an adequate amount of the cross-linking agent and the soft component, and measuring the elongation percentage of the cured 'soft' according to ASTM D-412 after curing the 'soft.

The soft polyester comprised in the elastic texture coating solution of the present invention may have a weight-average molecular weight of 1,000 to 2,000. This is preferable in that the texture of the surface being shown is realized and adhesive properties are provided. When the weight-average molecular weight of the soft polyester resin is less than 1,000, a large amount of the curing agents is required due to high OH values and being a reason of cost increase, and when exceeding 2,000, there are problems of requiring additional viscosity adjustments due to high viscosities.

Also, it is preferable for the weight-average molecular weight of the hard polyester resin to be 4,000~5,000 in that it may provide abrasion resistance. When the weight-average molecular weight of the hard polyester resin is less than 4,000, there are concerns of the boundary with the soft resin may be uncertain, and when exceeding 5,000, it becomes too hard and adjusting the amount of additive is not easily done, and there are problems of having to adding an excessive amount of the soft resin.

The elastic texture coating solution of the present invention comprises any one of the urethane acrylate resin or the polyester resin, and may be used by mixing both of the resins depending on circumstances. By forming the coating layer mixing a fixed ratio of both of the resin, the in-mold transfer film, in which various texture effects of rubber texture, skin texture, silk texture, etc. are possible, may be provided.

Also, the elastic texture coating solution may further comprise additives of an isocyanate curing agent, a matting agent, a levelling agent, a dispersant, a thinner, etc.

The isocyanate curing agent may use at least one selected from a group of hexamethylenediisocyanate (HMDI), toluene diisocyanate (TDI), diphenylmethane diisocyanate (MDI), isophorone diisocyanate (IPDI), etc. This isocyanate curing agent may be comprised in a range of 0 to 30 parts by weight based on 100 parts by weight of the entire elastic texture coating solution, and is preferable to limit the amount the curing agent to less than 20 parts by weight to increase moldability, and is more preferable to comprise 15 to 20 parts by weight.

It is preferable for the matting agent to be comprised 5 to 10 parts by weight based on 100 parts by weight of the entire elastic texture coating solution. As the amount of the matting agent becomes less than 5 parts by weight, it becomes sticky, and when exceeding 10 parts by weight and increasing, surface becomes rugged. Also, it is preferable for the size of the matting agent to be 3 to 8 μm, and especially 5 to 8 μm. When size of the matting agent is less than 3 μm, gloss drops too much and scratch occurs, and when exceeding 8 μm, abrasion resistance and gloss may become insufficient.

For the levelling agent, a fluorine or a silicon levelling agent may be used. Here, comprising the silicon levelling agent is preferable, and for the silicon levelling agent, reactive silicon, polydimethylsiloxane, polyester modified polydimethylsiloxane, polymethylalkylsiloxane, etc. may be used.

For the silicon leveling agent, the reactive silicon is especially preferable, and by adding the reactive silicon, vitality is given to a surface and scratch resistance lasts for long periods of time. Here, the mixing amount of the leveling agent may comprise 0.01 to 5 parts by weight based on 100 parts by weight of the entire elastic texture coating solution.

The printed layer (130) may be formed by gravure coating methods. The printed layer (130) has same or different designs with each other and may be realized freely in desired shapes of portraits, patterns, various colors, various designs, etc.

The adhesive layer (140) may be formed by using gravure printing or roll coating adhesives of polyester, polyurethane, acryl, EVA (ethylene co-vinylacetate), PVAc (polyvinyl acetate), PVC (polyvinyl chloride), etc.

Method for Manufacturing In-Mold Transfer Film

Figure 3:
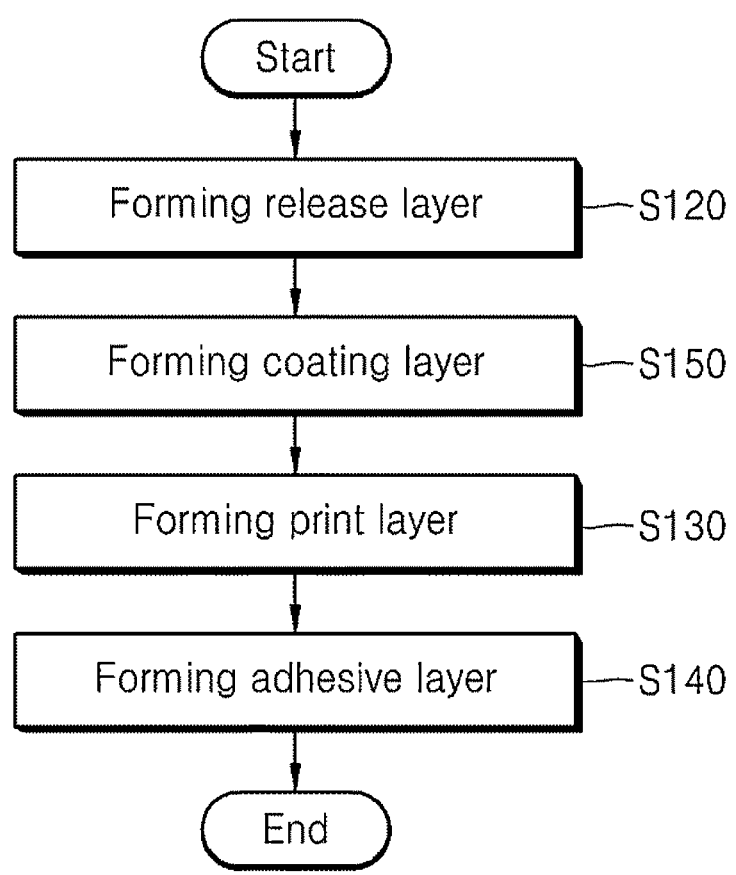
FIG. 3 is a flowchart showing a method for manufacturing an in-mold transfer film in accordance with an embodiment of the present invention

Meanwhile, FIG. 3 is a process schematic diagram showing an outline of a manufacturing process of an in-mold transfer film, and is described in further detail in reference to this.

Referring to FIG. 3, it comprises forming a release layer on the upper surface of a substrate layer (S120), forming a printed layer on the upper surface of the release layer (S130), and forming an adhesive layer on the upper surface of the printed layer (S140). Here, the release layer comprises a matte surface layer.

Here, in the forming a release layer on the upper surface of a substrate layer (S120), the method is not specifically limited, and a method coating a release agent formed from at least one material selected from an unsaturated ester based, an epoxy based, an epoxy-melamine based, an aminoalkyd based, an acrylic based, a melamine based, a fluorine based, a cellulose based, a urea resin based, a polyolefine based, and a paraffin based on the upper surface of the base film and drying may be used. The release layer comprises a matte surface layer, and this is as described above.

It is not shown in the drawings, but forming a coating layer on top of the release layer comprising the matte surface layer (S150) may be further comprised.

More specifically, the forming the coating layer step (S150) applies an elastic texture coating solution on top of the release layer, and coats the applied elastic texture coating solution comprising any one among a thermal curing or a UV curing.

Here, contents about the elastic texture coating solution are as described above. Also, when the elastic texture coating solution comprises the urethane acrylate resin, coating by a UV curing is preferable in the aspect of manufacturing speed, and when comprising the soft polyester resin and the hard polyester resin, coating by a thermal curing is preferable in the aspect of maintaining surface properties.

But, when the elastic texture coating solution mixes the urethane acrylate resin and the polyester resin, manufacturing by a hybrid method is also possible. For example, in the case of the elastic texture coating solution with both resins mixed, for the method for forming a coating layer, a final product may be completed by applying by first thermal curing and then second UV curing, or first UV pre-curing and another second UV curing.

The UV curing may further comprise a photo initiator, etc. For the photopolymerization initiator, at least one selected among benzophenone, benzyl ketone, 2-chloro-thioxanthone, 2,4-diethyl thioxanthone, benzoin ethyl ether, diethoxy acetophenone, benzyl methyl ketal, 2-hydroxy-2-methyl-1-phenyl-propanone, and 1-hydroxy-cyclohexyl phenyl ketone may be used. This photopolymerization initiator accelerates the chain reaction of the UV curable resin by a radical reaction occurring from an excitation by the UV.

Hereinafter, configuration and effects of the present invention are described in further detail through preferred examples of the present invention. But, the following examples are provided as preferred examples of the present invention and the scope of the present invention is not limited to these. Contents not presented here may be inferred by those skilled in the arts and its description is skipped.

1. Manufacturing an In-Mold Transfer Film

Example 1

A release layer is formed by applying a melamine release composition with a thickness of 4 μm on the upper surface of a PET film with a thickness of 50 μm, and then a coating layer with a thickness of 5 μm is formed on the upper surface of the release layer. The release layer comprises an acrylic resin composed of 15% of 2-hydroxyethyl methacrylate (2-HEMA), 10% of butyl methacrylate (BMA), 35% of methyl metacrylate (MMA), and 40% of other components. Here, the release layer comprises a matte surface layer, and is composed comprising 6 parts by weight of a matte additive composed of 99.8% of $SiO_2$, 0.01% of $Al_2O_3$, 0.03% of $TiO_2$, 0.05% of $Na_2O$, 0.01% of other, etc., and silica particles with mean diameter of 5 μm per 100 parts by weight of the entire matte surface layer composite.

The coating layer comprises 5:5 of a soft polyester with a weight-average molecular weight of 1,500 and a hard polyester with a weight-average molecular weight of 4,500, and an elastic texture coating solution comprising 15 parts by weight of hexanethylene diisocyanate (HDI) and 7 parts by weight of a matting agent (size 8 μm) based on 100 parts by weight of the elastic texture coating solution is applied on the upper surface of the release layer, and is formed by thermal curing.

And then, a printed layer with a thickness of 5 μm is formed on the upper surface of the coating layer by a gravure coating, and then an in-mold transfer film is manufactured by forming an adhesive layer with a thickness of 1 μm on the upper surface of the printed layer.

Example 2

A release layer is formed by applying a melamine release composition with a thickness of 4 μm on the upper surface of a PET film with a thickness of 50 μm, and then a coating layer with a thickness of 30 μm is formed on the upper surface of the release layer. The release layer comprises an acrylic resin composed of 15% of 2-hydroxyethyl methacrylate (2-HEMA), 10% of butyl methacrylate (BMA), 35% of methyl metacrylate (MMA), 40% of other components. Here, the release layer comprises a matte surface layer, and is composed comprising 8 parts by weight of a matte additive composed of 99.8% of $SiO_2$, 0.01% of $Al_2O_3$, 0.03% of $TiO_2$, 0.05% of $Na_2O$, 0.01% of other, etc., and a silica particle with a mean diameter of 5 μm based on 100 parts by weight of the entire matte surface layer composite.

The coating layer comprises 5:5 of a soft polyester with a weight-average molecular weight of 1,000 and urethaneacrylate with a weight-average molecular weight of 10,000, and an elastic texture coating solution comprising 20 parts by weight of hexanethylene diisocyanate (HDI), 7 parts by weight of matting agent (size 8 μm), 1 parts by weight of benzophenone based on 100 parts by weight of the elastic texture coating solution is applied on the upper surface of the release layer, and is formed by a first thermal curing and a second UV curing.

And then, a printed layer with a thickness of 5 μm is formed on the upper surface of a coating layer by a gravure coating, and then an in-mold transfer film is manufactured by forming an adhesive layer with a thickness of 1 μm on upper of the printed layer.

Comparative Example 1

Except that a release layer does not comprise a matte surface layer, an in-mold transfer film was manufactured in a same manner as in Example 1.

Comparative Example 2

Except that a coating layer is formed comprising a normal coating solution on the upper surface of a release layer, an in-mold transfer film was manufactured in a same manner as in Example 1. The normal coating solution is composed by mixing 25% of a polyurethane resin, 8% of a polyacryl resin, 2% of a silica powder, 65% of EAC, and the coating layer was formed by a thermal curing after applying the normal coating solution on the upper surface of the release layer.

2. Physical Properties Evaluation

A final abrasion resistant injection molding sample for the evaluation was manufactured by injection molding the manufactured transfer film with a PC/ABS resin, and then thermal curing and UV curing the molded injection product.

And then glossiness of the injection molding sample was measured (BYK E 4460), and existence of abrasion was observed by the naked eye using a RCA device of Norman-Tool for an abrasion resistance tester and evaluated. Also, texture characteristics were identified through the naked eye and touching.

TABLE 1

|  | Glossiness | Abrasion resistance (RCA) | Texture characteristics |
|---|---|---|---|
| Example 1 | 5 | Excellent | Excellent |
| Example 2 | 4 | Excellent | Excellent |
| Comparative example 1 | 40 | Poor | Normal |
| Comparative example 2 | 15 | Normal | Poor |

When examining abrasion resistance in accordance with glossiness, scratch of a surface was not identified when glossiness was 5 or below and scratch resistance was excellent, and stickiness occurs when glossiness is 40 or over.

Referring the table 1, Examples 1 and 2 having excellent abrasion resistance from glossiness measurements of 5 or less from the release layer comprising the matte surface layer, and also having excellent texture characteristics form the coating layer comprising the elastic texture coating solution was identified. But on the contrary, Comparative example 1 had normal texture characteristics but a great amount of scratch occurred due to high glossiness from not comprising the matte surface layer, and Comparative example 2 had normal scratch resistance, but there were insufficient texture characteristics from comprising the coating layer composed of the normal coating solution.

As a result, The Examples 1 and 2 of the present invention may maintain adequate glossiness by the matte surface layer, and it was known to realize an elastic texture by the coating layer comprising the elastic texture coating solution.

The invention claimed is:

1. An in-mold transfer film comprising:
a base film;
a release layer;
a coating layer;
a printed layer; and
an adhesive layer;
wherein the base film, the release layer, the coating layer, the printed layer, and the adhesive layer are stacked from bottom to top in this order,
wherein the release layer comprises a matte surface layer, and
wherein the coating layer is formed from an elastic texture coating solution,
wherein the elastic texture coating solution comprises at least one selected from the group consisting of a urethane acrylate resin and a polyester resin, and
wherein the polyester resin comprises a soft polyester resin and a hard polyester resin,
wherein the soft polyester resin and the hard polyester resin are presented in a ratio of 4:6 to 6:4,
wherein the soft polyester resin has a weight-average molecular weight of 1,000 to 2,000, and
wherein the hard polyester resin has a weight-average molecular weight of 4,000 to 5,000.

2. An in-mold transfer film according to claim 1, wherein the matte surface layer comprises silica particles.

3. An in-mold transfer film according to claim 2, wherein a mean diameter of the silica particle is 1 to 8 μm.

4. The in-mold transfer film according to claim 1, wherein the release layer comprises at least one material selected from the group consisting of a unsaturated ester based material, an epoxy based material, an epoxy-melamine based material, an aminoalkyd based material, an acrylic based material, a melamine based material, a fluorine based material, a cellulose based material, a urea resin based material, a polyolefine based material, and a paraffin based material.

5. The in-mold transfer film according to claim 1, wherein the soft polyester resin has an elongation percentage from 200% to 800% according to ASTM D412.

6. The in-mold transfer film according to claim 1, wherein the hard polyester resin has an elongation percentage of 150% or less according to ASTM D412.

7. The in-mold transfer film according to claim 1, wherein the soft polyester resin has an elongation percentage from 300% to 800% according to ASTM D412.

8. The in-mold transfer film according to claim 1, wherein the hard polyester resin has an elongation percentage of 100% or less according to ASTM D412.

9. The in-mold transfer film according to claim 1, wherein the elastic texture coating solution further comprises at least one select from the group consisting of an isocyanate curing agent, a matting agent, a levelling agent, a dispersant, and a thinner.

10. The in-mold transfer film according to claim 9, wherein the elastic texture coating solution comprises the isocyanate curing agent, and wherein the isocyanate curing agent is at least one selected from the group consisting of hexamethylenediisocyanate (HMDI), toluene diisocyanate (TDI), diphenylmethane diisocyanate (MDI), and isophorone diisocyanate (IPDI).

11. The in-mold transfer film according to claim 9, wherein the elastic texture coating solution comprises the matting agent, and wherein the matting agent has a size from 3 μm to 8 μm.

12. The in-mold transfer film according to claim 9, wherein the elastic texture coating solution comprises the matting agent, and wherein the matting agent has a size from 5 µm to 8 µm.

13. The in-mold transfer film according to claim 9, wherein the elastic texture coating solution comprises the levelling agent, and wherein the levelling agent comprises at least one selected from the group consisting of a fluorine levelling agent and a silicon levelling agent.

14. The in-mold transfer film according to claim 13, wherein the levelling agent comprises the silicon levelling agent, and wherein the silicon levelling agent comprises at least one selected from the group consisting of reactive silicon, polydimethylsiloxane, polyester modified polydimethylsiloxane, and polymethylalkylsiloxane.

15. The in-mold transfer film according to claim 1, wherein the adhesive layer comprises at least one selected from the group consisting of a polyester adhesive, a polyurethane adhesive, an acryl adhesive, an EVA (ethylene co-vinylacetate) adhesive, a PVAc (polyvinyl acetate) adhesive, and a PVC (polyvinyl chloride) adhesive.

* * * * *